(12) United States Patent
Saar et al.

(10) Patent No.: US 9,372,787 B2
(45) Date of Patent: Jun. 21, 2016

(54) SYSTEM AND METHOD FOR AUTOMATING TESTING

(71) Applicants: Asaf Saar, Leimen (DE); Alex Sudkovich, Ashdod (IL); Georgi Hristov, Sofia (BG); Sreevatsa Sreerangaraju, Bangalore (IN)

(72) Inventors: Asaf Saar, Leimen (DE); Alex Sudkovich, Ashdod (IL); Georgi Hristov, Sofia (BG); Sreevatsa Sreerangaraju, Bangalore (IN)

(73) Assignee: SAP SE, Waldorf (DE)

( * ) Notice: Subject to any disclaimer, the term of this patent is extended or adjusted under 35 U.S.C. 154(b) by 0 days.

(21) Appl. No.: 13/942,337

(22) Filed: Jul. 15, 2013

(65) Prior Publication Data

US 2015/0020052 A1  Jan. 15, 2015

(51) Int. Cl.
*G06F 9/44* (2006.01)
*G06F 11/36* (2006.01)

(52) U.S. Cl.
CPC .......... *G06F 11/3688* (2013.01); *G06F 11/368* (2013.01)

(58) Field of Classification Search
CPC .......................... G06F 11/3668; G06F 11/368
USPC .................... 717/127, 131, 124, 134
See application file for complete search history.

(56) References Cited

U.S. PATENT DOCUMENTS

| | | | |
|---|---|---|---|
| 6,889,158 B2 | 5/2005 | Penov et al. | |
| 7,694,181 B2 | 4/2010 | Noller et al. | |
| 7,930,683 B2 | 4/2011 | Li | |
| 8,065,661 B2 | 11/2011 | Sattler et al. | |
| 8,311,794 B2 | 11/2012 | Saterdag et al. | |
| 8,347,267 B2 | 1/2013 | Givoni et al. | |
| 8,428,900 B2 | 4/2013 | Wang | |
| 8,458,666 B2 | 6/2013 | Mitra | |
| 8,700,763 B2 * | 4/2014 | Mackey | 709/224 |
| 2002/0116153 A1 | 8/2002 | Wybouw-Cognard | |
| 2007/0220341 A1 | 9/2007 | Apostoloiu et al. | |
| 2008/0086499 A1 | 4/2008 | Wefers et al. | |
| 2011/0283148 A1 | 11/2011 | Rossi | |
| 2012/0174075 A1 * | 7/2012 | Carteri et al. | 717/127 |
| 2012/0198422 A1 * | 8/2012 | Huang et al. | 717/125 |
| 2012/0246619 A1 | 9/2012 | Thirumalai et al. | |
| 2013/0007522 A1 | 1/2013 | Kurapati et al. | |
| 2013/0145250 A1 | 6/2013 | Neumueller et al. | |

OTHER PUBLICATIONS

SmartBear, "Web Testing and Tabbed Browsers", Jul. 2012, retrieved from https://web.archive.org/web/20120707012624 over http://support.smartbear.com/articles/testcomplete/tabbed-browsing/ , 13 pages.*

Microsoft MSDN Library "Configuration Files", retrieved from https://web.archive.org/web/20110928192450 linked over http://msdn.microsoft.com/en-us/library/1xtk877y(v=VS.110).aspx , Sep. 2011, 3 pages.*

(Continued)

*Primary Examiner* — Ted T Vo
(74) *Attorney, Agent, or Firm* — Buckley, Maschoff & Talwalkar LLC

(57) ABSTRACT

According to some embodiments, a method and apparatus are provided to receive browser automation code to automatically test a software application executed in a web browser and receive a first parameter to indicate a first type of web browser and a second parameter to indicate a second type of web browser. The browser automation code is executed in the first type of web browser and the browser automation code is executed in the second type of web browser.

18 Claims, 4 Drawing Sheets

(56) References Cited

OTHER PUBLICATIONS

Tyme, "Tools for Cross Browser Compatibility: Live Testing", Jul. 2012, retrieved from http://www.htmlgoodies.com/print/beyond/webmaster/toolbox/print.php/3915226/Tools-for-Cross-Browser-Compatibility-Live-Testing.htm vie https://web.archive.org/ , 7 pages.*

W3schools.com, "HTML Forms and Input", Jan. 2011, retrieved from http://www.w3schools.com/html/html_forms.asp via https://web.archive.org/, pp. 1-3.*

* cited by examiner

| Browser Type 302 | Order 304 | IP Address 306 |
|---|---|---|
| Chrome | 2 | 192.168.3.2 |
| Internet Explorer | 3 | 192.168.3.2 |
| Firefox | 3 | 192.168.3.7 |
| Opera | 1 | 192.168.3.19 |

SYSTEM AND METHOD FOR AUTOMATING TESTING

BACKGROUND

Many software applications function as web-based applications which are accessed via a web browser such as, for example, Internet Explorer, Chrome, Firefox, and Safari. To test a web-based application using multiple web browsers, test automation is frequently used. Test automation, in this case, refers to using a software tool to run repeatable tests against a web-based application. A number of open source tools are available for test automation. Selenium, for example, is an open source test automation tool.

However, to run the same tests using a plurality of web browsers, the test automation tool must rely on specific testing code that is developed for each specific type of web browser. For example, a first version of the testing software will be needed to test a web-based application on a Chrome web browser and a second version of the testing software will be needed to test the web-based application on an Internet Explorer web browser. Having multiple platform-based versions of testing software makes it difficult to maintain the testing software since the testing software has to be maintained for each specific web browser.

DETAILED DESCRIPTION

The present embodiments relate to a test automation framework that provides developers with an ability to execute a same test on different web browsers, desktops and mobile devices without modifying their testing software. Automated tests may be executed on desktop or mobile browsers like Internet Explorer, Firefox, Chrome, as well as browsers for mobile devices such as an iPad, iPhone, an Android phone or an Android tablet. In some embodiments, the framework may function as a framework over a Selenium automation tool.

Figure 1:
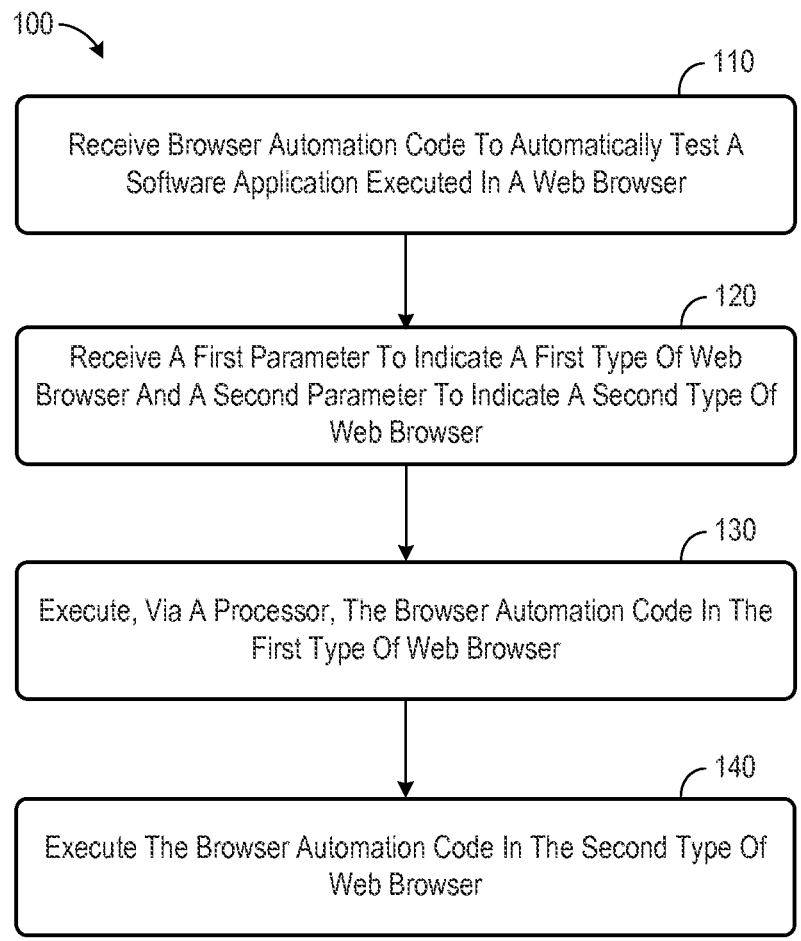
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 4.

At 110, browser automation code to automatically test a software application executed in a web browser is received. The browser automation code may comprise code that defines a specific sequence of events to test a web based application. For example, the browser automation code may define a sequence of radio buttons or check boxes to use, forms to be filled out (and the associated data for said forms) and/or sequences of text to be input. The browser automation code may be associated with an open source automation tool used for test automation such as, but not limited to, Selenium's open source automation tool.

For illustrative purposes, and to aid in understanding features of the specification, an example will be introduced. This example is not intended to limit the scope of the claims. Now referring to FIG. 2, browser automation code 203 to automatically test a software application that will be executed in both Chrome and Internet Explorer is received at a testing apparatus 201.

Figure 2:
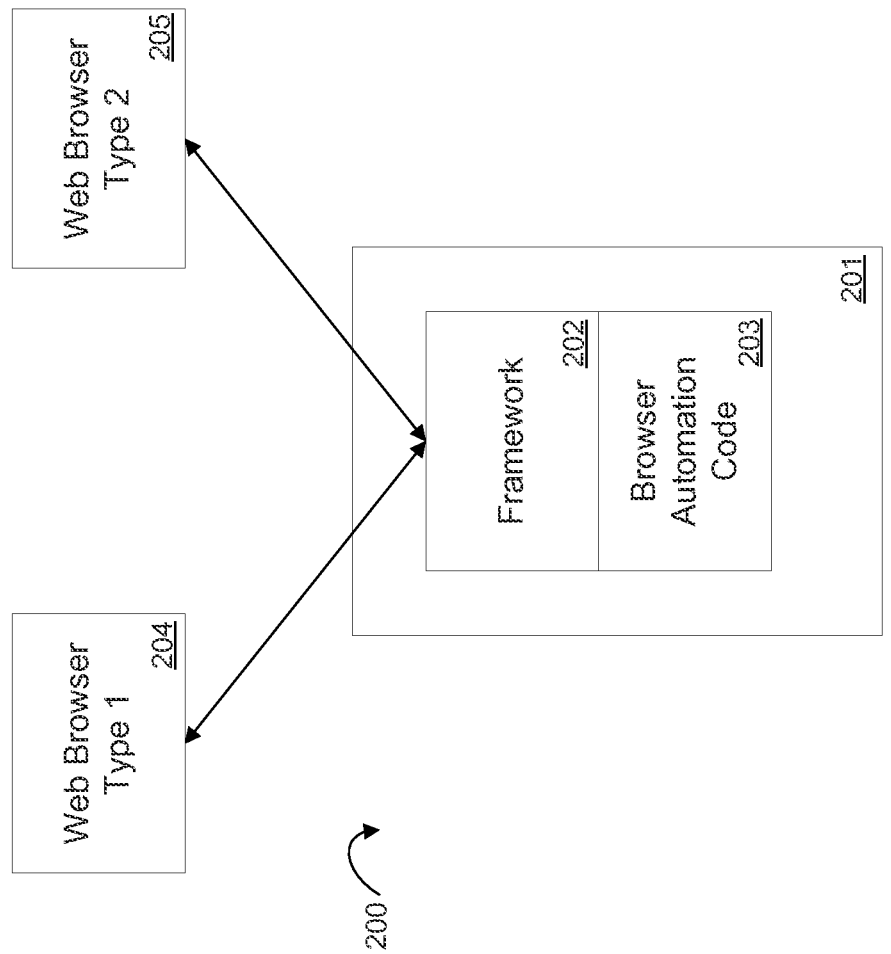
FIG. 2 illustrates a system according to some embodiments.

FIG. 2 illustrates an embodiment of a system 200 which comprises the testing apparatus 201. The testing apparatus 201 may execute testing software to test a web based application on a web browser of a first type 204 and on a web browser of a second type 205. The testing software comprises the browser automation code 203 and a framework 202. The browser automation code 203 may comprise code that defines a specific testing sequence of events that will be used to test the web-based application. The framework 202 may comprise a framework that wraps around the browser automation code 203 so that the framework 202 functions as an interface to a variety of web browsers and thus the browser automation code 203 is insulated from the type of web browser it is testing. For example, the framework 202 may provide an interface for computer code based on a Selenium automation tool to interface with a plurality of web browsers.

Referring back to FIG. 1, at 120 a first parameter to indicate a first type of web browser and a second parameter to indicate a second type of web browser are received. The first parameter may be contained in a configuration file, or as an input parameter to a framework, such as framework 202. Continuing with the above example, a first parameter, that indicates a Chrome web browser, and a second parameter, that indicates an Internet Explorer web browser are received in a configuration file, such as that described with respect to FIG. 3.

At 130, the browser automation code is executed in the first type of web browser. The browser automation code may be executed via a processor. Since each web browser may require different binaries (e.g., browser specific binaries) in order for the browser automation code to execute, the browser automation code may interface with a framework to communicate with the first type of web browser. The framework may be based on an object-oriented computer programming language such as, for example Java.

In practice, the framework may receive the first parameter and second parameter and based on each received parameter, drivers and/or binaries that are associated with a specific type of web browser may be emulated. For example, the framework may use an object class or classes to emulate binaries for Internet Explorer or an object class or classes to emulate binaries for Chrome. In this way, the browser automation code used for testing is never changed or modified to interface with different types of web browsers.

For example, the following example driver factory class may create drivers for different web browser such as, but not limited to, Android, iPhone, iPad, Internet Explorer, Firefox, Safari, and Chrome.

```
public class DriverFactory {
    private enum Browsers { ANDROID, IPHONE, IPAD,
INTERNETEXPLORER, FIREFOX, SAFARI, CHROME}
```

-continued

```
        public static final String FIREFOX_PROFILE_KEY = "FirefoxProfile";
        public static RemoteWebDriver getDriver(DesiredCapabilities desiredCapabilities) throws Exception {
            RemoteWebDriver driver = null;
            String browserName = (String) desiredCapabilities.getCapability(CapabilityType.BROWSER_NAME);
            switch (Browsers.valueOf(browserName.toUpperCase( ).replaceAll("\\s+", "")))
            {
              case ANDROID:
                  driver = new AndroidDriver(getDriverRemoteAccess( ), desiredCapabilities);
                  break;
              case IPHONE:
              case IPAD:
                  driver = new IPhoneDriver(getDriverRemoteAccess( ));
                  break;
              case INTERNETEXPLORER:
                  driver = new InternetExplorerDriver(desiredCapabilities);
                  break;
              case FIREFOX:
        if(desiredCapabilities.getCapability(FIREFOX_PROFILE_KEY) != null)
                      driver = new FirefoxDriver((FirefoxProfile) desiredCapabilities.getCapability(FIREFOX_PROFILE_KEY));
                  else
                      driver = new FirefoxDriver(desiredCapabilities);
                  break;
              case SAFARI:
                  driver = new SafariDriver(desiredCapabilities);
                  break;
              case CHROME:
                  driver = new ChromeDriver( );
                  break;
            }
            return driver;
        }
        public static DesiredCapabilities getDesiredCapabilities(String driverEnvironment) {
            DesiredCapabilities desiredCapabilities = null;
            switch (Browsers.valueOf(driverEnvironment.toUpperCase( )))
            {
              case ANDROID:
                  desiredCapabilities = DesiredCapabilities.android( );
                  break;
              case IPHONE:
                  desiredCapabilities = DesiredCapabilities.iphone( );
                  break;
              case IPAD:
                  desiredCapabilities = DesiredCapabilities.ipad( );
                  break;
              case INTERNETEXPLORER:
                  desiredCapabilities = DesiredCapabilities.internetExplorer( );
                  break;
              case FIREFOX:
                  desiredCapabilities = DesiredCapabilities.firefox( );
                  break;
              case SAFARI:
                  desiredCapabilities = DesiredCapabilities.safari( );
                  break;
              case CHROME:
                  desiredCapabilities = DesiredCapabilities.chrome( );
            }
            return desiredCapabilities;
        }
        private static URL getDriverRemoteAccess( ) throws Exception {
            URL url = CommonUtils.buildUrl(Environment.getDriverProtocol( ), Environment.getDriverIP( ), null,
                Environment.getDriverPort( ), Environment.getDriverPath( ), null, null);
            return url;
        }
    }
```

Therefore, based on a type of browser and/or platform associated with the first parameter and the second parameter, drivers and/or binaries that are associated with the specific type of web browser may be emulated. Continuing with the above example, browser automation code is executed in a Chrome web browser.

The object classes may also create a runtime environment that the framework 202 may use to communicate between the created drivers and/or binaries and the browser automation code 203. An example of an object class to create a browser specific runtime environment is disclosed below.

```
public class Environment {
        private static final String DRIVER_BROWSER_NAME = "Driver.Browser_Name";
        private static final String EXTERNALLY_CONFIGURED_BROWSER_NAME =
"system";
        private static String ENVIRONMENT_FILE_WIN = "\\Automation\\Test-
Parameters\\Environment.properties";
        private static String ENVIRONMENT_FILE_MAC = "/Automation/Test-
Parameters/Environment.properties";
        private static Properties environment = new Properties( );
        private static final String INTERNET_EXPLORER = "internetexplorer";
        private static final String FIREFOX = "firefox";
        private static boolean propertiesFileExists = true;
        static {
          String userHome = System.getProperty("user.home");
          FileInputStream in = null;
          try {
                if(isWindowsOS( ))
                       in = new FileInputStream(userHome +
ENVIRONMENT_FILE_WIN);
                else if(isMacOS( ))
                       in = new FileInputStream(userHome +
ENVIRONMENT_FILE_MAC);
                else
                       propertiesFileExists = false;
             environment.load(in);
          } catch (FileNotFoundException e) {
                propertiesFileExists = false;
          } catch (IOException e) {
                e.printStackTrace( );
          } finally {
                if(in!=null) {
                       try {
                            in.close( );
                       } catch (IOException e) {
                            e.printStackTrace( );
                       }
                }
          }
        }
        public static String getOSName( ) {
                return System.getProperty("os.name");
        }
        public static boolean isWindowsOS( ) {
                 return getOSName( ).toLowerCase( ).indexOf("win") >= 0;
        }
        public static boolean isMacOS( ) {
                return getOSName( ).toLowerCase( ).indexOf("mac") >= 0;
        }
        public static String getParameter(String key) {
                String param = System.getProperty(key);
                if(param != null)
                       return param;
          return environment.getProperty(key);
        }
        public static String getEnvironmentBrowserName( ) {
                return System.getProperty("browser", null);
        }
        public static boolean isPropertiesFileConfiguration( ) {
                return propertiesFileExists;
        }
        public static String getBrowserName( ) {
                String browserName = getParameter(DRIVER_BROWSER_NAME);
                if(browserName==null ||
browserName.equalsIgnoreCase(EXTERNALLY_CONFIGURED_BROWSER_NAME))
{
                       browserName = System.getProperty("browser", isMacOS( ) ?
FIREFOX : (isWindowsOS( ) ? INTERNET_EXPLORER : null));
                }
                return browserName;
        }
        public static String getDriverProtocol( ) {
                 return getParameter("Driver.Remote.Protocol");
        }
         public static String getDriverIP( ) {
                 return getParameter("Driver.Remote.Host");
        }
        public static String getDriverPort( ) {
                return getParameter("Driver.Remote.Port");
        }
        public static String getDriverPath( ) {
                return getParameter("Driver.Remote.Path");
```

```
    }
    public static String getAutProtocol( ) {
            return getParameter("Aut.Protocol");
    }
    public static String getAutHost( ) {
            return getParameter("Aut.Host");
    }
    public static String getAutDomain( ) {
            return getParameter("Aut.Domain");
    }
    public static String getAutPort( ) {
            return getParameter("Aut.Port");
    }
    public static String getAutPath( ) {
            return getParameter("Aut.Path");
    }
}
```

Next, at 140, the browser automation code is executed in the second type of web browser. Continuing with the above example, browser automation code is executed in an Internet Explorer web browser.

Figure 3:
FIG. 3 illustrates a portion of a configuration file according to some embodiments.

Now referring to FIG. 3, an embodiment of a configuration file 300 is illustrated. The configuration file 300 may include, for example, entries relating to specific web browsers to be tested. The table may also define fields 302, 304, and 306 for each of the entries. The fields 302, 304 and 306 may, according to some embodiments, specify: a browser type 302, an order 304 that the testing of browsers will occur, and an internet protocol ("IP") address 306 of a testing platform (e.g., computer) comprising the web browser. In this sense, the testing may occur on a platform other than a computer that comprises the browser automation code. For example, if the automatic testing is to be performed on a mobile device that uses a mobile based web browser (e.g., iPhone or Opera), a connection may automatically be made to that mobile device for automatic testing.

Figure 4:
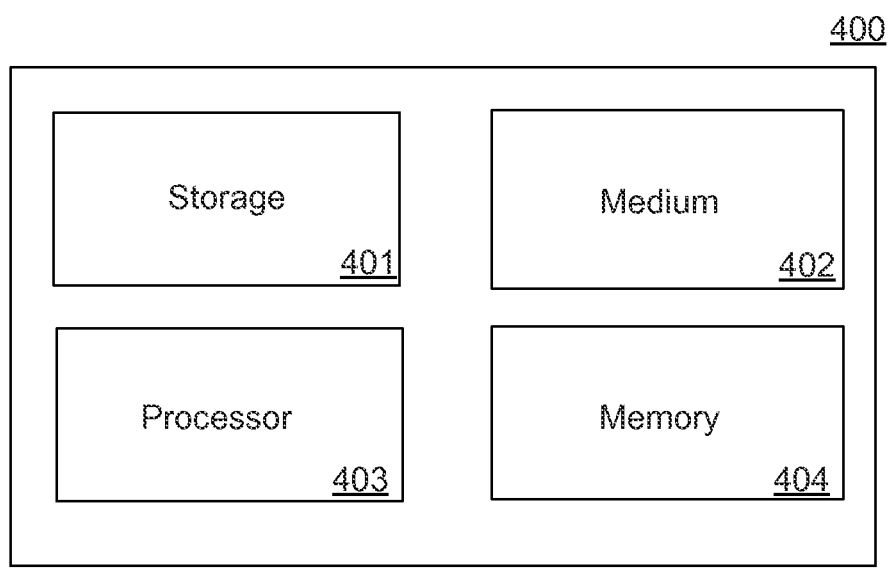
FIG. 4 illustrates an apparatus according to some embodiments.

Now referring to FIG. 4, an embodiment of an apparatus 400 is illustrated. In some embodiments, the apparatus 400 may be associated with a testing apparatus comprising a framework. In one embodiment, the apparatus 400 may receive browser automation code to be executed in conjunction with a framework. The browser automation code may be executed on the apparatus 400 or may be executed on a remote apparatus.

The apparatus 400 may comprise a storage device 401, a medium 402, a processor 403, and memory 404. According to some embodiments, the apparatus 400 may further comprise a digital display port, such as a port adapted to be coupled to a digital computer monitor, television, portable display screen, or the like.

The medium 402 may comprise any computer-readable medium that may store processor-executable instructions to be executed by the processor 403. For example, the medium 402 may comprise a non-transitory tangible medium such as, but not limited to, a compact disk, a digital video disk, flash memory, optical storage, random access memory, read only memory, or magnetic media.

A program may be stored on the medium 402 in a compressed, uncompiled and/or encrypted format. The program may furthermore include other program elements, such as an operating system, a database management system, and/or device drivers used by the processor 403 to interface with peripheral devices.

The processor 403 may include or otherwise be associated with dedicated registers, stacks, queues, etc. that are used to execute program code and/or one or more of these elements may be shared there between. In some embodiments, the processor 403 may comprise an integrated circuit. In some embodiments, the processor 403 may comprise circuitry to perform a method such as, but not limited to, the method described with respect to FIG. 1.

The processor 403 communicates with the storage device 401. The storage device 401 may comprise any appropriate information storage device, including combinations of magnetic storage devices (e.g., a hard disk drive), optical storage devices, flash drives, and/or semiconductor memory devices. The storage device 401 stores a program for controlling the processor 403. The processor 403 performs instructions of the program, and thereby operates in accordance with any of the embodiments described herein.

The main memory 404 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 404 may comprise a plurality of memory modules.

As used herein, information may be "received" by or "transmitted" to, for example: (i) the apparatus 400 from another device; or (ii) a software application or module within the apparatus 400 from another software application, module, or any other source.

In some embodiments, the storage device 401 stores a database (e.g., including information associated with web browser binaries). Note that the database described herein is only an example, and additional and/or different information may be stored therein. Moreover, various databases might be split or combined in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method to automate software testing without changing browser automation code, the method comprising:
   receiving browser automation code to automatically test a software application executed in a web browser, the browser automation code comprising computer code that defines a specific sequence of events for testing the software application;
   receiving a first parameter to indicate a first type of web browser;

executing, via a processor, the browser automation code in the first type of web browser via a framework comprising one or more object classes that interfaces between the browser automation code and the first type of web browser by emulating binaries associated with the first type of web browser based on the received first parameter, where executing the browser automation code in the first type of web browser comprises creating, via the one or more object classes, a first browser specific runtime environment to communicate between the emulated binaries and the browser automation code, and where the browser automation code executed in the first type of web browser is the received browser automation code;

receiving a second parameter to indicate a second type of web browser; and executing the browser automation code in the second type of web browser via the framework that interfaces between the browser automation code and the second type of web browser by emulating binaries associated with the second type of web browser based on the received second parameter where the browser automation code executed in the second type of web browser is the received browser automation code, where executing the browser automation code in the second type of web browser comprises creating, via the one or more object classes, a second browser specific runtime environment to communicate between the emulated binaries and the browser automation code.

2. The method of claim 1, wherein the specific sequence of events comprise a combination of (i) radio buttons or check boxes to activate, (ii) forms to be filled out or (iii) sequences of text to be input.

3. The method of claim 1, wherein the framework program is based on an object-oriented computer programming language and comprises a class to create drivers associated with the received first parameter and second parameter.

4. The method of claim 1, wherein the received first parameter and second parameter are stored in a configuration file.

5. The method of claim 1, wherein a first of the one or more object classes is to emulate binaries associated with the first type of web browser and a second of the one or more object classes is to emulate binaries associated with the second type of web browser.

6. A non-transitory computer-readable medium comprising instructions that when executed by a processor perform a method to automate software testing without changing browser automation code, the method comprising:

receiving browser automation code to automatically test a software application executed in a web browser, the browser automation code comprising computer code that defines a specific sequence of events for testing the software application;

receiving a first parameter to indicate a first type of web browser;

executing, via a processor, the browser automation code in the first type of web browser via a framework comprising one or more object classes that interfaces between the browser automation code and the first type of web browser by emulating binaries associated with the first type of web browser based on the received first parameter, where executing the browser automation code in the first type of web browser comprises creating, via the one or more object classes, a first browser specific runtime environment to communicate between the emulated binaries and the browser automation code, and where the browser automation code executed in the first type of web browser is the received browser automation code;

executing the browser automation code in the second type of web browser via the framework that interfaces between the browser automation code and the second type of web browser by emulating binaries associated with the second type of web browser based on the received second parameter where the browser automation code executed in the second type of web browser is the received browser automation code, where executing the browser automation code in the second type of web browser comprises creating, via the one or more object classes, a second browser specific runtime environment to communicate between the emulated binaries and the browser automation code.

7. The medium of claim 6, wherein the browser automation code is interfaced with a framework program to communicate with the first type of web browser and the second type of web browser.

8. The medium of claim 6, wherein the specific sequence of events comprise a combination of (i) radio buttons or check boxes to activate, (ii) forms to be filled out or (iii) sequences of text to be input.

9. The medium of claim 7, wherein the framework program is based on an object-oriented computer programming language and comprises a class to create drivers associated with the received first parameter and second parameter.

10. The medium of claim 7, wherein the received first parameter and second parameter are stored in a configuration file.

11. The medium of claim 6, wherein a first of the one or more object classes is to emulate binaries associated with the first type of web browser and a second of the one or more object classes is to emulate binaries associated with the second type of web browser.

12. An apparatus comprising:
a processor; and
a non-transitory computer-readable medium comprising instructions that when executed by a processor perform a method to automate software testing without changing browser automation code, the method comprising:

receiving browser automation code to automatically test a software application executed in a web browser, the browser automation code comprising computer code that defines a specific sequence of events for testing the software application;

receiving a first parameter to indicate a first type of web;

executing, via the processor, the browser automation code in the first type of web browser via a framework comprising one or more object classes that interfaces between the browser automation code and the first type of web browser by emulating binaries associated with the first type of web browser based on the received first parameter, where executing the browser automation code in the first type of web browser comprises creating, via the one or more object classes, a first browser specific runtime environment to communicate between the emulated binaries and the browser automation code, and where the browser automation code executed in the first type of web browser is the received browser automation code;

executing the browser automation code in the second type of web browser via the framework that interfaces between the browser automation code and the second type of web browser by emulating binaries associated with the second type of web browser based on the received second parameter where the browser automation code executed in the second type of web browser is the received browser automation code, where executing the browser automation code in the second type of web browser comprises creating, via the one or more object classes, a second browser specific runtime environment to communicate between the emulated binaries and the browser automation code.

13. The apparatus of claim 12, wherein the browser automation code is interfaced with a framework program to communicate with the first type of web browser and the second type of web browser.

14. The apparatus of claim 13, wherein the framework program is based on an object-oriented computer programming language and comprises a class to create drivers associated with the received first parameter and second parameter.

15. The apparatus of claim 14, wherein the framework program creates a runtime environment to communicate between the created drivers and the browser automation code.

16. The apparatus of claim 12, wherein the specific sequence of events comprise a combination of (i) radio buttons or check boxes to activate, (ii) forms to be filled out or (iii) sequences of text to be input.

17. The apparatus of claim 12, wherein the received first parameter and second parameter are stored in a configuration file.

18. The apparatus of claim 12, wherein a first of the one or more object classes is to emulate binaries associated with the first type of web browser and a second of the one or more object classes is to emulate binaries associated with the second type of web browser.

* * * * *